United States Patent [19]

Nozawa et al.

[11] Patent Number: 4,534,001
[45] Date of Patent: Aug. 6, 1985

[54] NUMERICAL CONTROL SYSTEM

[75] Inventors: Ryoichiro Nozawa, Shibuya; Nobuyuki Kiya, Hachioji, both of Japan

[73] Assignee: Fanuc Ltd., Minamitsuru, Japan

[21] Appl. No.: 444,574

[22] PCT Filed: Mar. 23, 1982

[86] PCT No.: PCT/JP82/00079
§ 371 Date: Nov. 15, 1982
§ 102(e) Date: Nov. 15, 1982

[87] PCT Pub. No.: WO82/03282
PCT Pub. Date: Sep. 30, 1982

[30] Foreign Application Priority Data

Mar. 23, 1981 [JP] Japan ............... 56-042195
Mar. 23, 1981 [JP] Japan ............... 56-042196

[51] Int. Cl.³ .................. G06F 15/46; G05B 19/18
[52] U.S. Cl. ..................... 364/474; 364/167; 364/191; 364/900

[58] Field of Search ........... 364/474, 475, 191-193, 364/167-171, 200 MS File, 900 MS File; 318/568; 112/121.11, 121.12, 158 E

[56] References Cited

U.S. PATENT DOCUMENTS

| 4,051,794 | 10/1977 | Herzer et al. | 112/121.12 |
| 4,116,143 | 9/1978 | Manabe | 318/568 X |
| 4,201,144 | 5/1980 | Manabe et al. | 112/121.12 |
| 4,218,982 | 8/1980 | Daido et al. | 112/158 E |
| 4,396,974 | 8/1983 | Imazeki et al. | 364/474 X |

Primary Examiner—Joseph Ruggiero
Attorney, Agent, or Firm—Staas & Halsey

[57] ABSTRACT

Among machining commands, symbols denoting moving directions, and movement data held in correspondence with data numbers are separately stored in a command area (101) and a data area (102), so that when a predetermined machining command, including a data number, has been read out from the command area, the movement data is read out of a memory location corresponding to the data number of this machining command, so as to successively perform predetermined numerical control processing.

7 Claims, 6 Drawing Figures

| Step Nos. | | | Data Nos. | |
|---|---|---|---|---|
| 1 | | | 1 | 15000 |
| | | | 2 | |
| 19 | X | 13 | 3 | |
| 20 | M | □□ | ⋮ | ⋮ |
| 21 | R | 13 | | |
| 22 | + | 1 | | |
| 23 | W | 13 | | |
| 24 | J | 19 | 13 | 100000 |
| 25 | | | | |

101                    102

NUMERICAL CONTROL SYSTEM

BACKGROUND OF THE INVENTION

The present invention relates to a numerical control system, and more particularly to a numerical control system, in which a memory within a numerical control apparatus can be utilized in an effective manner.

A numerical control apparatus (hereinafter, referred to as "NC") reads out machining data in succession and performs predetermined numerical control processing on the basis of the machining data, to thereby machine a workpiece as programmed.

A machining data input method has heretofore been such that a machining program is punched in a paper tape beforehand and that each time the numerical control processing based on the machining data of one block ends, the machining data of the next block is read out by means of a tape reader. Since, however, such a method cannot realize numerical control processing at high speed, a method referred to as "memory operation" has recently come into widespread use. The memory operation is such that a machining program recorded on an external storage medium, e.g., a paper tape, is previously stored in a memory built in the NC, and the machining data is successively read out of the memory at the time of numerical control processing. According to such a memory operation method, a high-speed numerical control processing becomes possible. However, the capacity of the memory must be made large in order to store a long machining program, and this has led to such disadvantages such as high cost, etc.

SUMMARY OF THE INVENTION

The present invention has an object to provide a numerical control system which can utilize a memory effectively, in other words, which can store larger quantities of machining data than in the prior art, in a memory of limited capacity.

The present invention provides a numerical control system wherein a memory is sectioned into, at least, a command area for storing a plurality of machining commands and a data area for storing movement data corresponding to various target positions or movement values and wherein among the machining commands, at least those concerning movements are constructed of alphabetic letters indicating moving directions and data numbers corresponding to memory locations storing the movement data. When a predetermined machining command has been read out from the command area, the movement data is read out from the memory location corresponding to the data number of this machining command, and a tool or a table is moved on the basis of this movement data. In the numerical control system wherein transfer commands for "read" and "write" and operation commands, the operands of which are data numbers, are set as machining commands, and when these commands are properly arranged in a machining program, the movement data stored in a data area is changed using these commands, and a tool or the like is moved using the changed movement data.

DESCRIPTION OF THE PREFERRED EMBODIMENTS

In order to elucidate the present invention more specifically, embodiments of the present invention will now be described in detail with reference to the drawings.

Figure 1:
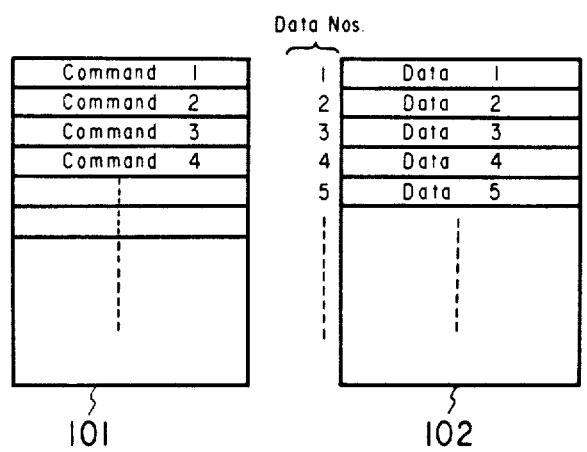
FIGS. 1 and 2 are diagrams for elucidating the outline of the present invention.
Figure 2:
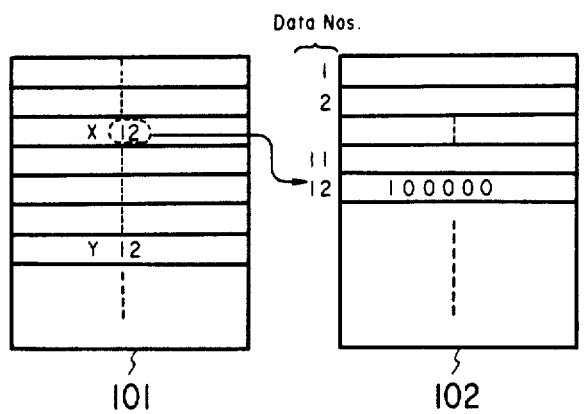

FIGS. 1 and 2 are explanatory diagrams for elucidating the outline of the present invention. In FIGS. 1 and 2, numerals 101 and 102 designate a command area and a data area which constitute a memory built into an NC, respectively. That is, the memory built in the NC is sectioned into, at least, the command area 101 and the data area 102. Machining commands (Command 1, Command 2, ... ) which have a command form peculiar to the present invention, to be described later, are stored in the command area 101, while items of movement data (Data 1, Data 2, ... ) which correspond to various target positions or movement values are stored in the data area 102. In the present invention, at least those commands which concern movements have the following particular form:

$$X i \qquad (1)$$

Here, the alphabetic letter X denotes movement in the X axis. In cases of movements along the Y and Z axes, the alphabetic letter X is replaced with Y and Z, respectively. In addition, i is a numerical value indicative of the memory position in the data area 102 which stores the value of the movement along the X axis, and is referred to as a data number (data No.). Let it now be supposed that a movement value 100000 ($\mu$) is stored in the predetermined address of the data area 102 corresponding to data No. 12 (FIG. 2), and that a movement command X12 is stored in the predetermined location of the command area 101. As numerical control processing proceeds, various commands are read out from the command area 101 in succession, and the movement command X12 is read out from the command area at a predetermined time. Then, the numerical value 100000, which is stored in the memory location of the data area 102 indicated by data No. 12, is read out as the movement value along the X axis by using this data number as a key or address. Further, when a movement command Y12 is read out from the command area, the numerical value 100000 stored in the memory location of the data area 102 indicated by data No. 12 is similarly read out as a movement value along the Y axis.

As seen from the above, in the present invention, the movement commands for moving a tool or the like by 100000 $\mu$ in the X-, Y- and Z-directions need not be:

X100000, Y100000, Z100000 as in the prior art, but may be:

X12, Y12, Z12 with 100000 stored in the memory location of data No. 12. It should be noted here that the maximum value of data numbers can be made sufficiently smaller than the maximum value of the actual movement values. Especially in such a case where commands of equal movement values are issued many times in one machining operation, the number of data items (kinds of movement values) to be stored in the data area 101 can be made still smaller, and the following holds:

$$\text{Maximum value of data Nos.} << \text{Maximum value of movement values} \quad (3)$$

Assuming now that the number of bits required for representing the maximum movement value is, e.g.; 32 bits, that the number of bits required for representing the maximum data number is, e.g., 6 bits, and that commands having an identical movement value arise n times, then the prior-art method and the method of the present invention need the following numbers of bits in order to store the movement values, respectively. The prior-art memory operation system needs:

$$32 \cdot n \text{ (bits)} \quad (4)$$

while the present invention needs:

$$6 \cdot n + 32 \text{ (bits)} \quad (5)$$

As seen from the foregoing, when $n \geq 2$ holds, that is, when the commands of the identical movement value arise two or more times, $$6 \cdot n + 32 < 32 \cdot n \quad (6)$$

holds, and the number of necessary bits based on the method of the present invention becomes smaller than that in the prior-art method. The difference becomes greater as n increases, that is, as the number of times identical movement values are commanded increases. In other words, according to the method of the present invention, larger quantities of machining data than in the prior-art method can be stored in a memory of an identical capacity.

Figure 3:
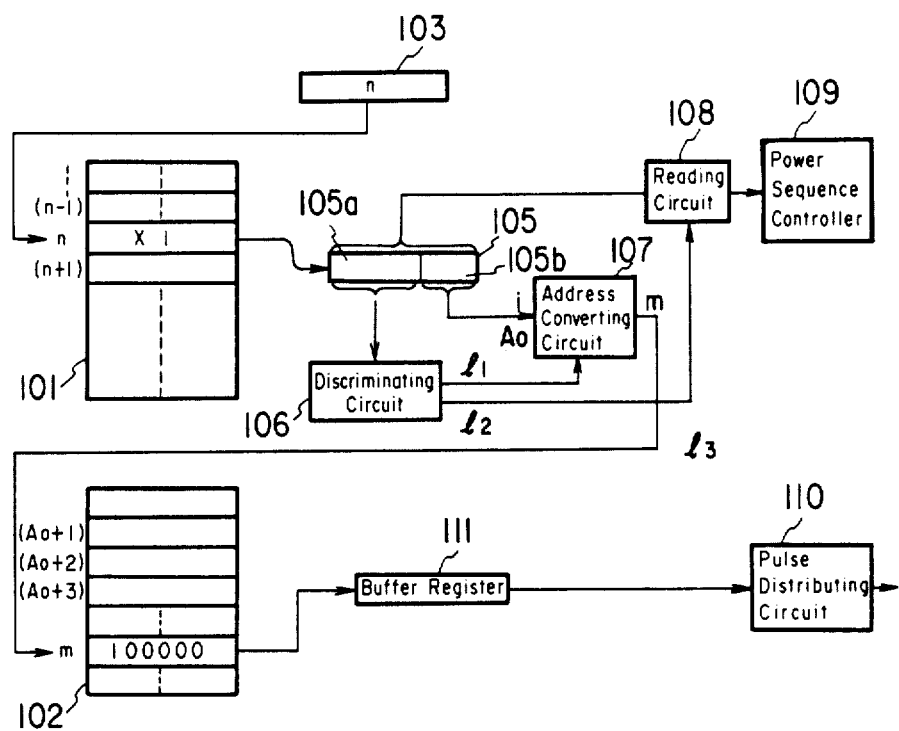
FIG. 3 is a block diagram of an embodiment of the present invention.

FIG. 3 is a block diagram showing an embodiment of the present invention. In the figure, numeral 101 designates the command area, and numeral 102 the data area. The movement command given in Equation (1) is stored at the address n of the command area 101. The data area 102 begins with address $(A_0+1)$. Various movement values required for, e.g., one machining operation are stored at the respective addresses $(A_0+1)$, $(A_0+2)$, $(A_0+3)$, ..., and the movement value 100000 is stored at the address m $(=A_0+1)$. Data Nos. 1, 2, 3, ... correspond to the addresses $(A_0+1)$, $(A_0+2)$, $(A_0+3)$, ..., respectively. Numeral 103 designates an instruction counter, which indicates the address of the command area 101 where the machining data (command) to be read out next is stored. The content of the instruction counter 103 is counted up by $+1$ each time the machining data (command) is read out, whereby it indicates the next address. Numeral 105 designates a buffer register which stores the command temporarily, and which has an alphabetic letter storing portion 105a and a data number storing portion 105b. Alphabetic letters include, besides X, Y and Z indicative of the moving directions, M, T, S, G etc. indicative of a miscellaneous function instruction, a tool change instruction, a spindle speed instruction, a preparatory function instruction, etc. Numeral 106 designates a discriminating or decoding circuit, to which the alphabetic letter is applied from the alphabetic letter storing portion 105a. The discriminating circuit delivers "1" on a line $l_1$ when the alphabetic letter is X, Y or Z, and delivers "1" on a line $l_2$ when the alphabetic letter is M, S or T. Numeral 107 denotes an address converting circuit, which converts the data number stored in the data number storing portion 105b, into the predetermined address for the data area 102 when "1" has appeared on line $l_1$ (when the alphabetic letter X, Y or Z has been read out of the command area). More specifically, since the data area 102 begins with the address $(A_0+1)$, the address converting circuit 107 executes the following operation where i is the data No.:

$$A_0 + i \rightarrow m \quad (7)$$

where $A_0$ could be considered a base address or an indexing address, and the converting circuit delivers the result of the operation to a line $l_3$. Shown at numeral 108 is a reading circuit, which delivers the content of the buffer register 105, for example, Moo, S∆∆ or T□□ to a power sequence controller to be described below, when "1" has been delivered on line $l_2$ (when the alphabetic letter M, S or T has been read out of the command area 101). Numeral 109 denotes the power sequence controller, which controls the exchange of data between the NC and a machine tool. Numeral 110 represents a well known pulse distributing circuit, and numeral 111 a buffer register. A movement value read out of the address indicated by the numerical value m delivered on line $l_3$ is temporarily stored in the buffer register 111 and is applied to the pulse distributing circuit 110.

The operations in FIG. 3 will now be explained. When, in a case where n is stored in the instruction counter 103 and numerical control processing based on an instruction stored at the address $(n-1)$ of the command area 101 has ended, the command (movement command)

$$X \ i$$

is read out from the address n and is applied to the buffer register 105. The alphabetic letter X stored in the alphabetic letter storing portion 105a is applied to the discriminating circuit 106 and is discriminated, so that "1" is delivered on the line $l_1$. On the other hand, data No. i stored in the data number storing portion 105b, and the numerical value $A_0$ are applied to the address converting circuit 107. Upon the delivery of "1" to the line $l_1$, therefore, the address converting circuit 107 executes the operation of Equation (7) and delivers the result m on the line $l_3$. Consequently, the movement value 100000 is read out from the address m of the data area 102 and is stored in the buffer register 111. Subsequently, the movement value stored in the buffer register 111 is applied to the pulse distributing circuit 110. As soon as the movement value has been applied, the pulse distributing circuit 110 starts a pulse distribution computation and applies distributed pulses to a servo control circuit (not shown) which rotates a motor and moves a tool or a workpiece so as to machine the workpiece as programmed. Although the embodiment of FIG. 3 has been described in the case of converting the data number into the address by means of the address converting circuit 107, this address converting circuit may be eliminated by employing data numbers as addresses themselves. Further, although the case where various movement values (incremental values) are stored in the data area has been described, various target positions (absolute values) may also be stored.

Figures 4, 5:
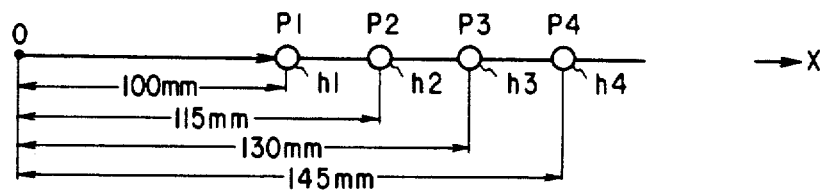
FIGS. 4 and 5 are diagrams of another embodiment in which transfer commands and operation commands are set as machining commands, movement data is changed using these commands, and positional control is performed using the changed movement data.
Figure 6:
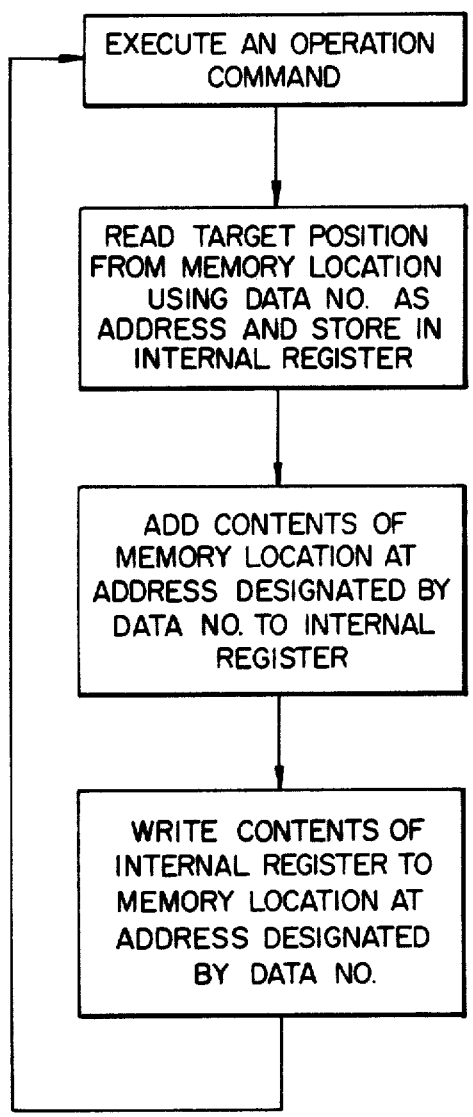
FIG 6 is a flow diagram of the operation associated with FIGS. 4 and 5.

FIGS. 4, 5 and 6 are explanatory diagrams of another embodiment of the present invention wherein transfer commands and operation commands are set as machining commands, movement data is changed by these commands, and positional control is performed by the use of the changed movement data.

In the figures, numeral 101 designates the command area, and numeral 102 the data area. Various machining commands are stored in the command area, while a plurality of target positions (numerical values) are stored in the data area. Among the machining commands, X i (i=1, 2, ...) is a command concerning movement as given in the abovementioned equation (1), M☐ is a miscellaneous function command for, e.g., punching, R i (i=1, 2, ...) is the transfer command for "read", W i (i=1, 2, ...) is the transfer command for "write", +i (i=1, 2, ...) is the operation command for addition, and J k (k=1, 2, ...) is a program control command for branch. The operands i of the respective commands X, R, W and + indicate a data number. The transfer command for "read", R i, has the function of reading out a target position (numerical value) from a memory location corresponding to the data No. i, into an internal register; the transfer command for "write", W i, has the function of writing the content of the internal register into the memory location corresponding to the data No. i; the operation command +i has the function of reading out the target position (numerical value) from the memory location corresponding to the data No. i and adding this target position to the content of the internal register; and the program control command J k has the function of jumping the control to step No. k and causing the NC to read the next command from the k-th step. Accordingly, when the commands are arranged as shown in FIG. 4 and 15000 ($\mu$) and 100000 ($\mu$) are respectively stored in data Nos. 1 and 13 in advance, positioning to points $P_1$, $P_2$, $P_3$, $P_4$ ... and punching of holes are successively executed as illustrated in FIG. 5. More specifically, as numerical control processing proceeds, the respective commands are successively read out from the command area. When X13 has been read out from the 19-th step at a predetermined time, the target position 100000 is read out from the memory location of the data area indicated by data No. 13, with this data No. used as a key. Thus, a pulse distributor (not shown) executes a pulse distribution computation on the basis of the target position information, so as to move a workpiece (for example, an iron plate) and to position the point $P_1$ underneath a punching head. After the positioning has ended, the miscellaneous function command for punching M☐ is read out and controls a punching press machine so as to form the hole $h_1$ at the point $P_1$. Subsequently, the transfer command for "read" R13 sets the target position (numerical value 100000) from the memory location of the data area indicated by the data No. 13, into the internal register (not shown) with this data number 13 used as the key. Thereafter, the operation command +1 reads out the numerical value 15000 from the memory location of the data area indicated by the data No. 1, with this data number 13 used as a key, and adds it to the content (100000) of the internal register.

Subsequently, the result (115000) is written into the memory position of the data No. 13 by the operation command for "write" W13. Lastly, the control is returned to Step 19 by the jump instruction J19. Thereafter, similar operations are repeated to perform the punching at the points $P_2$, $P_3$ and $P_4$ in succession. Using a conditional branch command, instead of the J instruction control can advance to the 25-th and ensuing steps after a predetermined number of holes have been machined.

As described above, the target positions stored in the data area can be successively updated to desired target positions by properly arranging the transfer commands, the operation command and the program control command, such as the jump instruction, in the machining program beforehand. Especially in such a case where the positioning and the machining as illustrated in FIG. 5 are carried out repeatedly a plurality of number of times, the number of commands in a machining program can be reduced, and the effective utilization of the memory is achieved conjointly with the procedure illustrated in FIGS. 1 and 2, so that the memory can be rendered smaller in capacity and lower in cost.

While, in the foregoing, the case of controlling one axis at a time has been explained, the present invention is not restricted to one-axis control but is also applicable to simultaneous two axis control, etc. In addition, various incremental values, absolute values or the like can be stored in the data area.

As set forth above, according to the present invention, in a machining operation in which an identical movement value appears repeatedly, the number of bits required for storing movement values can be greatly reduced as compared with that in the prior-art method. That is, larger quantities of machining data than in the prior-art method can be stored in a memory of identical capacity, and it has become possible to reduce the capacity and lower the cost of the memory. Moreover, target positions stored in a data area can be successively updated to desired target positions by properly arranging transfer commands, operation commands and program control commands, such as a jump instruction, in a machining program beforehand, and it has become possible to reduce the capacity of the memory.

What is claimed is:

1. A numerical control system, comprising:

memory and controller means for storing a machining program, and including a memory from which machining commands which comprise the machining program are successively read out, and a controller for performing predetermined numerical control processing, where at least the machining commands concerning movements comprise alphabetic letters indicating moving directions and data numbers corresponding to memory locations for storing movement data equivalent to target positions or movement values, and where said memory is sectioned into, at least, a command area for storing the machining commands, and a data area for storing the various movement data; and means for, when a predetermined machining command has been read out of the command area, reading out the movement data of the memory location corresponding to the data number of this machining command.

2. A numerical control system for moving a tool or a table, comprising:

a memory sectioned into, at least, a command area for storing a plurality of machining commands, and a data area for storing movement data corresponding to various target positions or movement values and where among the machining commands, at least, machining commands concerning movements comprise alphabetic letters indicating moving directions and data numbers corresponding to memory positions for storing the movement data;

means for, when a predetermined machining command has been read out of the command area, reading out the movement data from the memory location corresponding to the data number of the readout machining command, and for moving the tool or the table on the basis of this movement data; and means for, when transfer commands for "read" and "write" and operation commands, which employ the data numbers as operands, are output, changing the movement data stored in the data area in dependence upon these commands, so that the movement of the tool or the table is performed based on the changed movement data.

3. A numerical control system as defined in claim 2, further comprising an internal register operatively connected to said means for changing and wherein said means for changing reads out a first numerical value from the memory location corresponding to the data number which is the operand of a "read" command from among the transfer commands and stores said first numerical value in said internal register, reads out a second numerical value from the memory location corresponding to the data number which is the operand of the operation command, executes a predetermined operation by the use of the first and second numerical values, and stores a result of the operation in the memory location corresponding to the data number which is the operand of a "write" command from among the transfer commands.

4. A numerical control system, comprising:
control means for controlling a machine in accordance with numerical control commands;
memory means, operatively connected to said control means, for storing the numerical control commands including a movement command having a data number and for separately storing a movement amount corresponding to the data number; and
transfer means, operatively connected to said control means and said memory means, for causing transfer of the movement amount associated with the data number of the movement command to said control means when the movement command is output by said memory means.

5. A numerical control system as defined in claim 4, wherein said transfer means comprises:
decoding means, operatively connected to said memory means, for recognizing the movement command;
conversion means, operatively connected to said decoding means and said memory means, for converting the data number into an address of the movement amount in dependence upon the recognition of the movement command.

6. A numerical control method for moving a machine via a numerical controller controlled by machining commands including movement data associated with a movement command having a data number in a machining program stored in a memory, comprising the steps of:
(a) outputting the machining commands sequentially from the memory;
(b) recognizing the movement command;
(c) converting the data number in the movement command into a memory address;
(d) outputting the movement data from the memory in dependence upon the memory address; and
(e) moving the machine in dependence upon the movement data.

7. A method of numerical control processing in accordance with numerical control commands in a numerical control program using a memory, an internal register and a machine controller, said method comprising the steps of:
(a) reading a numerical control command out of the memory;
(b) loading the internal register with the contents of the memory location indicated by a data number included in a read command if the numerical control command is the read command;
(c) adding the contents of a memory location indicated by a data number included in a plus command to the internal register if the numerical control command is the plus command;
(d) writing the contents of the internal register into a memory location indicated by a data number included in a write command if the numerical control command is the write command; and
(e) executing the operation of the numerical control command if the numerical control command is not one of the read, the plus and the write numerical control commands.

* * * * *